(12) United States Patent
Traner

(10) Patent No.: US 7,753,184 B2
(45) Date of Patent: Jul. 13, 2010

(54) BIDIRECTIONAL CLUTCH MECHANISM

(76) Inventor: Michael Traner, 4448 Brandywine Dr., Boca Raton, FL (US) 33487

( * ) Notice: Subject to any disclaimer, the term of this patent is extended or adjusted under 35 U.S.C. 154(b) by 421 days.

(21) Appl. No.: 10/908,668

(22) Filed: May 22, 2005

(65) Prior Publication Data

US 2006/0260895 A1 Nov. 23, 2006

(51) Int. Cl.
F16D 41/00 (2006.01)
F16D 11/14 (2006.01)
F16D 43/202 (2006.01)
(52) U.S. Cl. .............. 192/43; 192/48.92; 192/51; 192/54.5; 192/69.81; 192/93 A
(58) Field of Classification Search ............... 192/54.5
See application file for complete search history.

(56) References Cited

U.S. PATENT DOCUMENTS

| | | | | |
|---|---|---|---|---|
| 949,179 | A | * 2/1910 | Gilbert | ............ 192/50 |
| 1,441,528 | A | * 1/1923 | Reid et al. | ............ 192/21 |
| 1,991,756 | A | * 2/1935 | Lazich | ............ 192/51 |
| 2,154,045 | A | * 4/1939 | Herrington | ............ 192/43 |
| 2,292,228 | A | * 8/1942 | Krieger | ............ 81/29 |
| 3,539,044 | A | * 11/1970 | Grimstad | ............ 192/21 |
| 4,253,554 | A | 3/1981 | Nisenson | |
| 4,982,823 | A | 1/1991 | Yoshida | |
| 5,222,582 | A | 6/1993 | Castens | |
| 5,503,261 | A | 4/1996 | Schultz | |
| 5,641,046 | A | 6/1997 | Levenberg | |
| 5,875,692 | A | * 3/1999 | Lin | ............ 81/58.3 |
| 6,379,276 | B1 | 4/2002 | Cheng | |
| 6,474,457 | B2 | 11/2002 | Saiko | |
| 6,575,280 | B2 | 6/2003 | Ballew et al. | |
| 6,685,592 | B2 | 2/2004 | Fraczek et al. | |
| 6,688,443 | B2 | 2/2004 | Liu | |
| 6,719,109 | B1 | 4/2004 | Li et al. | |

* cited by examiner

Primary Examiner—Rodney H Bonck
(74) Attorney, Agent, or Firm—John C. Smith (57) ABSTRACT

A bidirectional clutch with opposing output drives mounted over an internal support shaft, and a bidirectional clutch jaw positioned between them. The clutch jaw has opposing cam surfaces which cooperate with cam surfaces on the inside edge of the output drives. The clutch jaw further has forward and reverse driving surfaces which are associated with forward and reverse driving surfaces on the output drives. The clutch jaw moves between the output drives and engages only one output drive at a time. When the clutch is reversed, the cam surface on the output drive which was being driven imparts lateral force to the clutch jaw which moves it away from the active output drive to the inactive output drive. The clutch jaw disengages from the active output drive and then begins rotating the inactive output drive in the reverse direction.

8 Claims, 7 Drawing Sheets

Figure 2F

BIDIRECTIONAL CLUTCH MECHANISM

BACKGROUND OF THE INVENTION

1. Technical Field

The present invention relates to generally to bidirectional drive systems. In particular, it relates to a bidirectional clutch assembly with a reduced component count that is capable of high-speed rotational direction switching.

2. Background

The prior art has developed mechanical drives for a wide variety of devices, such as automobiles, manufacturing equipment, tools, window curtains, storm shutters, garage door openers, etc. The list of devices which can be adapted for use with a power drive (i.e. including, but not limited to, internal combustion engines, electric motors, pneumatic drives, etc.) encompasses almost every type of device.

For land-based vehicles, the drive system typically includes an internal combustion engine, wheels, and a transmission to convert engine torque to an appropriate level of power to be applied to the wheels. An important part of the transmission component is the clutch, which provides the ability to engage or disengage engine power from the wheels as needed. In addition to engaging and disengaging power from the wheels, there is also in need for the transmission to be able to reverse rotational energy to the wheels such that the vehicle can be moved in an opposite direction. Prior art transmission assemblies typically require complex gear arrangements in order to effect a reversal of transmission rotational energy. It would be desirable to have a simplified device for reversing rotational energy for the purpose of reducing the cost of providing the ability to reverse direction.

Those skilled in the art will recognize that in addition to conventional internal combustion vehicles, any other vehicle which requires the ability to reverse direction, such as electric cars, golf carts, or alternative fuel vehicles, will also require a bidirectional clutch to allow the vehicle to be reversed.

In addition to the issue of initial manufacturing cost, there is also an issue related to efficiency during normal operation. In particular, prior art clutches typically have numerous parts, each of which creates energy losses that produce the efficiency of the transmission, and overall vehicle efficiency. This is particularly true in the case of friction clutches which tend to be highly inefficient. It would be desirable to have a bidirectional clutch assembly which eliminated the need for friction plates.

In addition to vehicles, clutches have been employed in numerous applications which require motion reversal. For example, residential and commercial buildings typically use a variety of curtains which use clutch assemblies that allow the curtains to be extended or retracted either vertically or horizontally. Likewise, storm screens, hurricane shutters, projection screens, elevator drive systems, truck lifts, and numerous other devices, all rely on bidirectional drive assemblies to position their respective components. With these types of devices, physical space is often an important issue. The more complicated for this type of device increase both the cost of manufacture, as well as create design problems when attempting to accommodate the space they require inside the device. In addition, the more complicated the device is, the more likely it is that the device may fail. It would be desirable to have a low-cost device, which requires a minimum amount of space, and which also has a minimum amount of components to increase reliability and reduce the possibility of component failure.

Numerous other applications for bidirectional clutches also exist. In particular, a wide variety of manufacturing and assembly-line operations require the ability to engage and disengage power systems the purpose of controlling machinery or the movement of work items through the assembly process. As discussed above in regard to the previous applications, frequently used tools and manufacturing equipment require a high level of reliability, low-cost manufacture and efficient use of space. It would be desirable to have a clutch mechanism which could accomplish desired manufacturing goals with minimal cost and use of space.

Prior art clutches also are typically dedicated devices associated with a single function, such as a vehicular drive train. It would be desirable to have a single clutch assembly with the capability of simultaneously transmitting power to multiple devices and reversing that direction of those devices as needed.

In addition to the foregoing, prior art clutches typically require power to be applied to the clutch structure at a single component of the clutch. It would be desirable to have a universal clutch structure which allows input power to be applied to more than one component, depending on the particular application, to be exerted by other selectable components of the clutch, also depending on the particular application at hand.

Accordingly, there remains a need in the art for a low-cost bidirectional clutch that is inexpensive to manufacture, that is efficient during normal operation, that can be implemented with a minimal number of components to reduce the possibility of failure, and which provides a size advantage due to the low component count. Likewise, there is a need for a universal clutch structure that can be used across a wide variety of devices, which can have driving power applied to more than one component of the clutch, for more than one component of the clutch.

SUMMARY OF THE INVENTION

The present invention provides a bidirectional clutch which has opposing output drives mounted over an internal support shaft. Also mounted on the internal support shaft, and positioned between the output drives, is a bidirectional clutch jaw. The clutch jaw has opposing cam surfaces which are associated with cam surfaces on the inside edge of the output drives. The clutch jaw further has forward and reverse driving surfaces which are substantially perpendicular to the direction of rotation, and associated with forward and reverse driving surfaces on the output drives. The clutch jaw drives only one output drive at a time. When the clutch is reversed, the cam surface on the active output drive which was being driven imparts lateral force to the clutch jaw which moves it away from the active output drive to the inactive output drive. The clutch jaw disengages from the active output drive and then begins rotating the inactive output drive in the reverse direction.

DESCRIPTION OF THE PREFERRED EMBODIMENT

Prior to a detailed discussion of the figures, a general overview of the system will be presented. The invention provides a cam switched bidirectional clutch assembly which uses a minimal number of parts. It comprises a central support shaft onto which is mounted two output drives and an interposed clutch jaw that engages with one output drive at a time. The device provides several significant advantages in terms of flexibility and the types of applications for which it can be used. It can be used for any type of bidirectional application that requires lifting, lowering, or forward or reverse motion. Due to its simplicity it does not have to be mounted in any particular orientation. As a result, it can be mounted vertically, horizontally, etc., to suit whatever purpose it is intended for. It can be fabricated by any number of materials, so long as it suits the particular purpose the bidirectional clutch is intended to serve. In its simplest form, the device acts as its own bearing. It can't also be structured with bearing assemblies between the components. While lubrication would normally be used for any clutch assembly, depending on the application the clutch is used for, and the types of materials used to fabricate the bidirectional clutch (e.g. commercially available low friction materials such as nylon, UHMW, etc.), the clutch may not require any lubrication. The bidirectional clutch automatically changes direction when the direction of the input is reversed.

When the clutch is engaged and driving one of the output drives (the "first output drive",) the cam surface on the clutch jaw slidably engages the cam surface on the first output drive which is being driven. The clutch jaw also has a driving surface which engages a corresponding driving surface on the first output drive. As the clutch jaw rotates, its driving surface presses against the driving surface of the first output drive and causes the first output drive to rotate. When the clutch jaw reverses direction, its driving surface disengages from the driving surface on the first output drive and ceases driving it. Simultaneously, the cam surfaces on the clutch jaw and the output drive are structured such that when the clutch jaw continues to rotate in the reverse direction, the cam forces the clutch jaw to move laterally away from the first output drive and toward the inactive output drive (the "second output drive".)

The first and second output drives are spaced apart, and the clutch jaw is sized, such that when the clutch jaw clears contact with the previously driven output drive (i.e., the first output drive), it almost immediately engages the previously inactive output drive (i.e., the second output drive). The cam surfaces on the opposing sides of the clutch jaw are arranged in the opposite direction from one another such that when the clutch jaw is reversed, the driving surface on the clutch jaw is able to engage the driving surface on the output drive which it is now in contact with. The first and second output drives can be attached to any type of device which requires rotational energy for operation. They can be used in conjunction with any type of device which requires bidirectional operation, including vehicles, curtains, shades, shutters, blinds, elevators, industrial and manufacturing equipment, etc.

Those skilled in the art will recognize that the simple structure provided by this bidirectional clutch provides several advantages over the prior art. First, due to the minimal number of parts required to implement the clutch, the cost to manufacture the clutch is also reduced. Second, another significant advantage provided by the invention is that it has the ability to very rapidly reversed rotational direction. Third, due to the minimal number of parts required to implement invention, the bidirectional clutch can be incorporated into devices while taking a very small amount of space.

Having discussed the features and advantages of the invention in general, we turn now to a more detailed discussion of the figures.

Figure 1A:
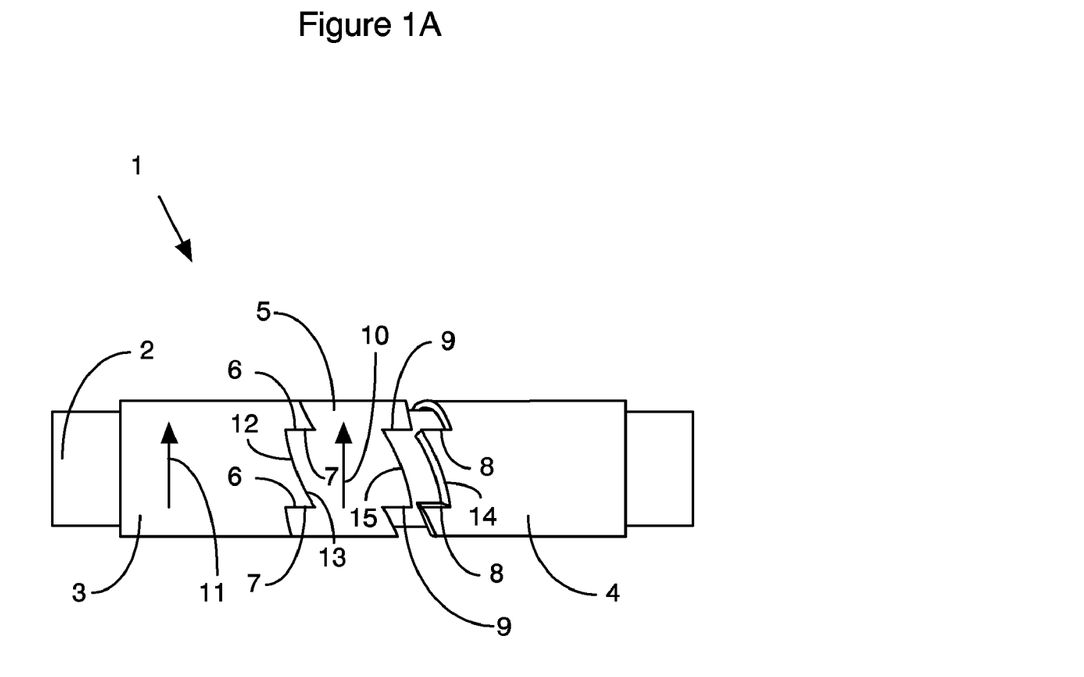
FIG. 1A is a side view illustrating a preferred embodiment of the bidirectional clutch with the clutch jaw rotating in a first direction and driving the first output drive.

In FIG. 1A, a side view of a preferred embodiment of the bidirectional clutch 1 is shown. For ease of illustration, only the basic clutch 1 components are shown in this figure. Both input power sources and power outputs have been intentionally omitted to better illustrate the interaction between output drives 3, 4 and clutch jaw 5. The output drives 3, 4, would use gears, chains, belts, direct drive, frictional drives, or any combination thereof, to drive the particular device that the bidirectional clutch 1 is attached to.

In the preferred embodiment, the support shaft 2 and the clutch jaw 5 are attached to one another. This can be accomplished by fabricating support shaft 2 and the clutch jaw 5 as a unitary structure, or by fabricating them as discrete components which are secured together.

If input power is provided by the support shaft 2, then it must be secured to the clutch jaw 5, and in addition, it must be able to move laterally to allow the clutch jaw 5 to migrate between the output drives 3, 4. Alternatively, it is also possible to attach the clutch jaw 5 to the support shaft 2 such that it rotates freely. In this situation, the clutch jaw 5, in addition to rotating about the support shaft 2, would also be free to slide laterally on the support shaft 2 such that it could migrate between the output drives 3, 4. In this situation, an external source of power would be required to rotate the clutch jaw 5. As was the case with the output drives 3, 4, the clutch jaw 5 can be attached to its power input via gears, chains, belts, direct drives, frictional drives, etc.

In this figure, an internal support shaft 2 provides support for first output drive 3 and for second output drive 4. Output drives 3, 4 are slidably mounted on support shaft 2 such that they can rotate freely, are otherwise fixed in their respective positions. Interposed between output drives 3, 4 is a clutch jaw 5. The edges of output drives 3, 4 which abut clutch jaw 5 have cam surfaces 12, 14 and driving surfaces 6, 8, respectively. Likewise, clutch jaw 5 has associated cam surfaces 13, 15 that correspond to cam surfaces 12, 14, respectively, and associated driving surfaces 7, 9 that correspond to driving surfaces 6, 8, respectively.

As shown in this figure, clutch jaw 5 is engaged with output drive 3. Clutch jaw 5 is rotating in the direction indicated by arrow 10. As clutch jaw 5 rotates, driving surface 7 is in contact with driving surface 6 of output drive 3. The force imparted to driving surface 6 by driving surface 7 causes output drive 3 to rotate with clutch jaw 5. Clutch jaw 5 is sized such that when it is engaged with output drive 3, there is no contact between clutch jaw 5 and output drive 4. As a result, output drive 4 remains motionless.

Figure 1B:
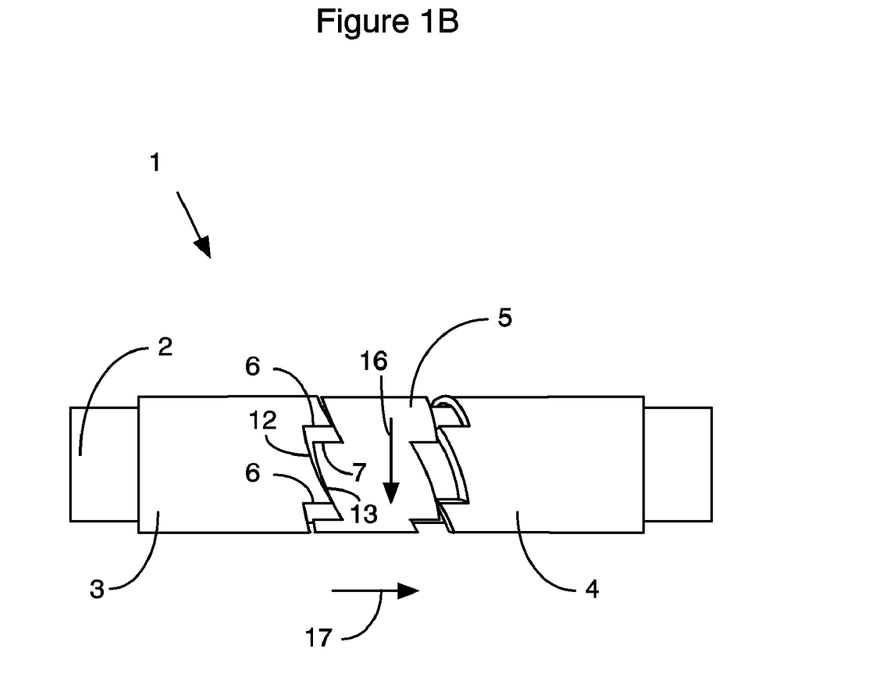
FIG. 1B is a side view illustrating the preferred embodiment of the bidirectional clutch as shown in FIG. 1A. This figure illustrates the bidirectional clutch as the rotation of the clutch jaw is being reversed.

FIG. 1B illustrates a side view of the preferred embodiment of the bidirectional clutch 1 when the rotation of the clutch jaw 5 is in the process of being reversed. During this procedure, the rotational direction of clutch jaw 5 is reversed from FIG. 1A and now travels in the direction indicated by arrow 16. Once this change in rotational direction occurs, driving surface 7 disengages from driving surface 6 in the rotation of output drive 3 halts. In addition, the cam surface 13 on clutch jaw 5 slides against cam surface 12 on output drive 3, and rides up the slope of cam surface 12 which forces clutch jaw 5 to move away from output drive 3 and toward output drive 4. This motion is indicated by arrow 17. The lateral motion of clutch jaw 5 will continue until it engages with output drive 4.

Figure 1C:
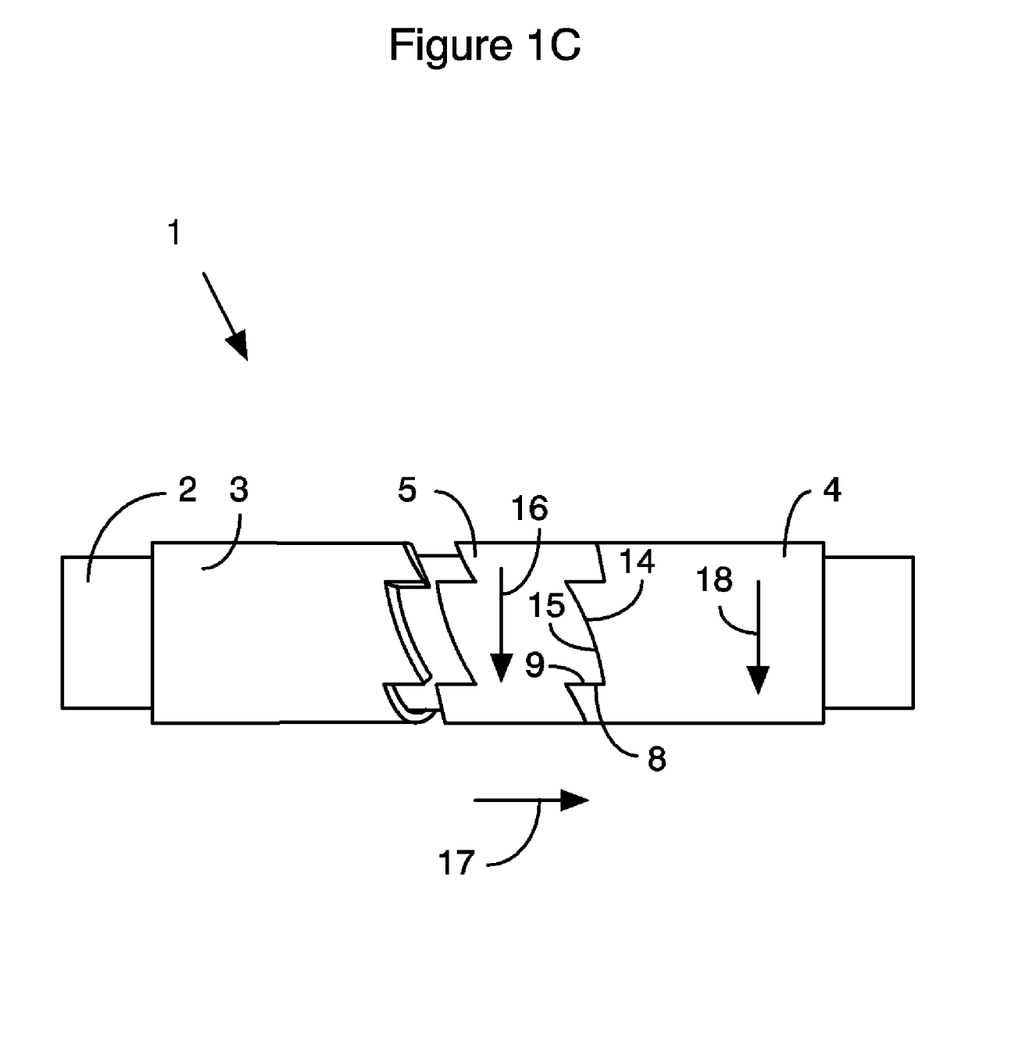
FIG. 1C is a side view illustrating the preferred embodiment of the bidirectional clutch as shown in FIG. 1A. This figure illustrates the bidirectional clutch when the reversal of clutch jaw rotation is complete.

FIG. 1C is a side view illustrating the preferred embodiment of the bidirectional clutch 1 as shown in FIG. 1A. In this figure, the reversal of clutch jaw 5 rotation, discussed above in regard to FIGS. 1A-B, has been completed. At this point in time, clutch jaw 5 as completely disengaged from output drive 3, and output drive 3 has stopped rotation. Likewise, the rotation of clutch jaw 5 in reversed rotational direction as indicated by arrow 16 has caused clutch jaw 5 to move in the lateral direction indicated by arrow 17 until it has completely engaged output drive 4. At this point in time, driving surface 9 of clutch jaw 5 has engaged driving surface 8 of output drive 4. In addition, cam surface 15 of clutch jaw 5 rests against cam surface 14 of output drive 4. As clutch jaw 5 rotates in direction 16, driving surface 9 applies forced to driving surface 8 to force output drive 4 to rotate in direction 18. As a result, reversing rotational direction of clutch jaw 5 deactivates rotation of output drive 3 which was rotating in the direction indicated by arrow 11, and activates output drive 4 to rotate in the opposite direction, as indicated by arrow 18.

For ease of illustration, the interaction between clutch jaw 5 and the output drives 3, 4, FIGS. 1A-C were shown using the assumption that the clutch jaw 5 and the support shaft 2 were a unitary structure and that power was applied to the support shaft 2 to rotate the clutch jaw 5. Alternatives to this structure will be discussed more fully below.

As can be seen from the foregoing, in its most basic form this invention provides a very simple structure with a minimal number of parts. This provides the ability to construct a bidirectional clutch 1 at a very low cost. In addition, the cam structure used by the bidirectional clutch 1 permits high speed direction reversal.

The foregoing drawings illustrate a basic bidirectional clutch 1 which uses output drives 3, 4 that slidably fit around a support shaft 2. Those skills in the art will recognize that in the configuration illustrated by FIGS. 1A-C, sufficient lubrication must be used to ensure that minimal amounts of friction are generated when output drives 3, 4 and clutch jaw 5 rotate around the support shaft 2.

In addition to the foregoing embodiment, those skilled in the art will recognize that is also possible to use a narrow support shaft 2 which is attached to the output drives 3, 4 and the clutch jaw 5 via sealed bearings which eliminate the need for lubrication, and which may reduce the total amount of friction generated by the bidirectional clutch 1. In addition, those skilled in the art will recognize that the size of the bidirectional clutch 1, and/or its components will vary depending on the function it is designed to perform. Likewise, the particular materials used to fabricate the bidirectional clutch 1, or any of its components, will vary to suit the weight, strength, and cost requirements of the particular function being performed. Neither the size nor the materials used are critical to this invention. Rather, they are dictated by the particular function being performed by the bidirectional clutch 1. The only requirement is that they be suitable for the particular function at hand.

Figure 2A:
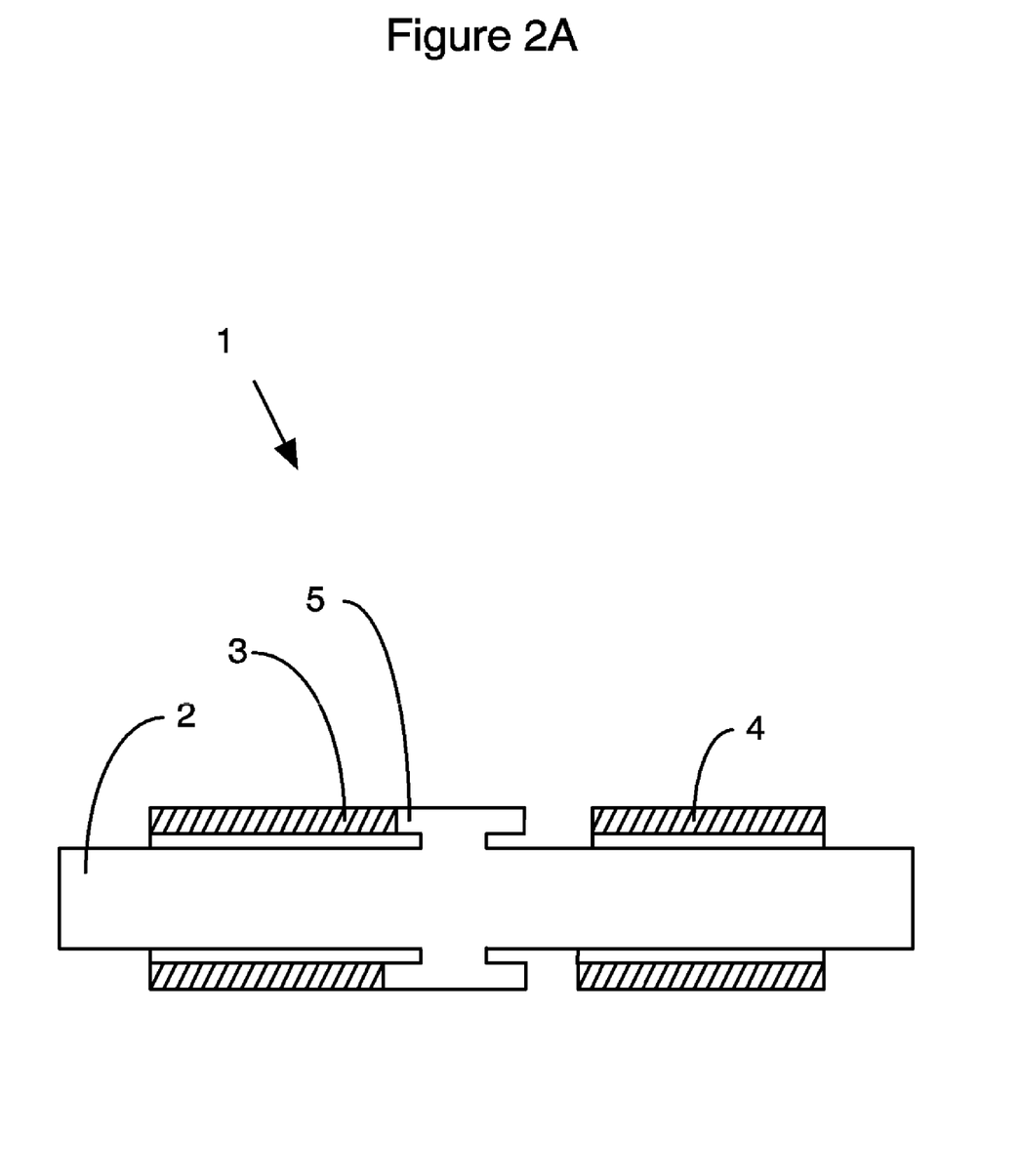
FIG. 2A illustrates a side cutaway view of a preferred embodiment of the bidirectional clutch wherein the support shaft and the clutch jaw are fabricated as a single integrated unit.

FIG. 2A illustrates a side cutaway view of a preferred embodiment of the bidirectional clutch 1 wherein the support shaft 2 and the clutch jaw 5 are fabricated as a single integrated unit. In this embodiment, rotational input power would be applied directly to the support shaft 2 which would in turn rotate clutch jaw 5.

Figure 2B:
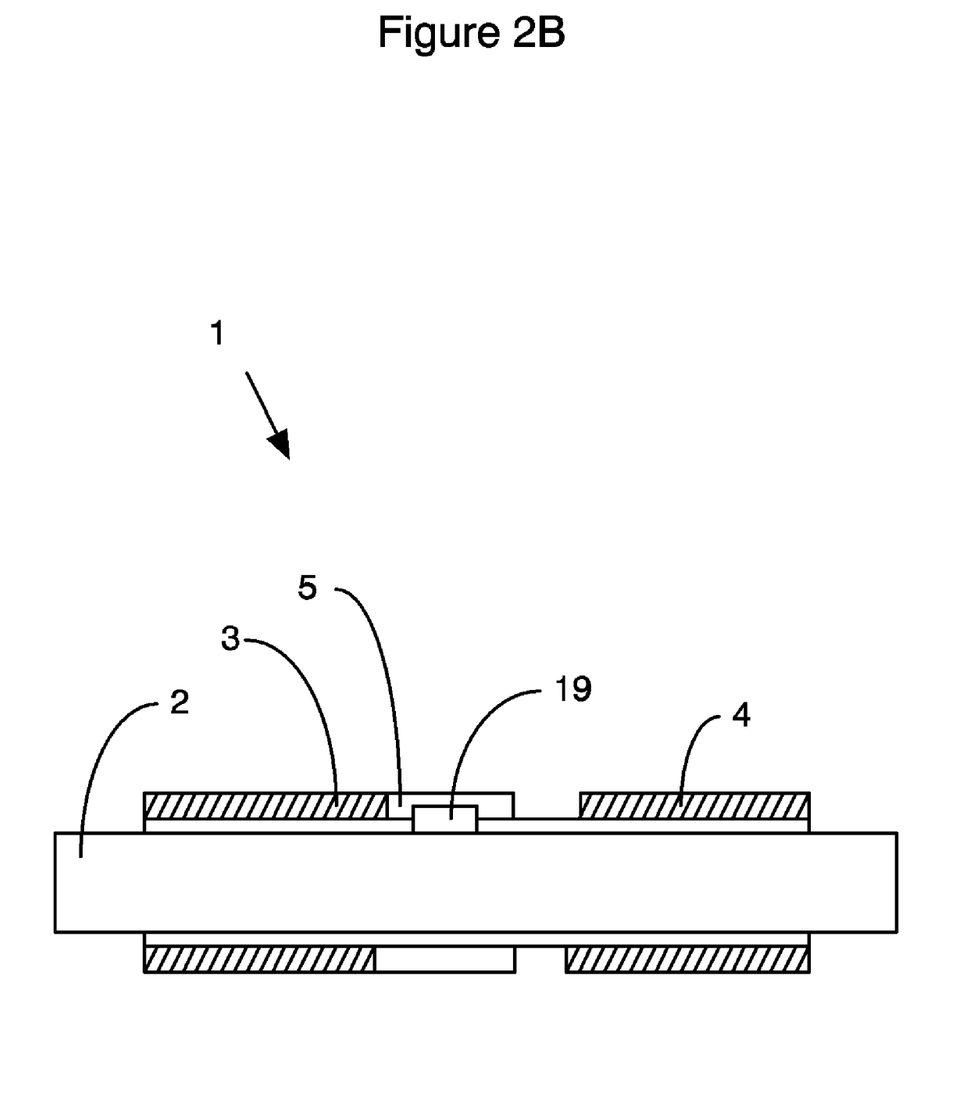
FIG. 2B illustrates a side cutaway view of an alternative preferred embodiment of the bidirectional clutch in which the support shaft and the clutch jaw are fabricated as separate components and secured together via a key structure.

FIG. 2B illustrates a side cutaway view of an alternative preferred embodiment of the bidirectional clutch 1 wherein the support shaft 2 and the clutch jaw 5 are fabricated as separate components and secured together via a key 19. The key 19 can be implemented as an integral component of the clutch jaw 5 that fits into a slot in the support shaft 2, as an integral component of the support shaft 2 that fits into a slot in the clutch jaw 5, or as an independent unit which fits into slots in the clutch jaw 5 and the support shaft 2. The only requirement is that the key 19 effectively secures the clutch jaw 5 and the support shaft 2 together such that movement of either forces movement of the other.

Figure 2C:
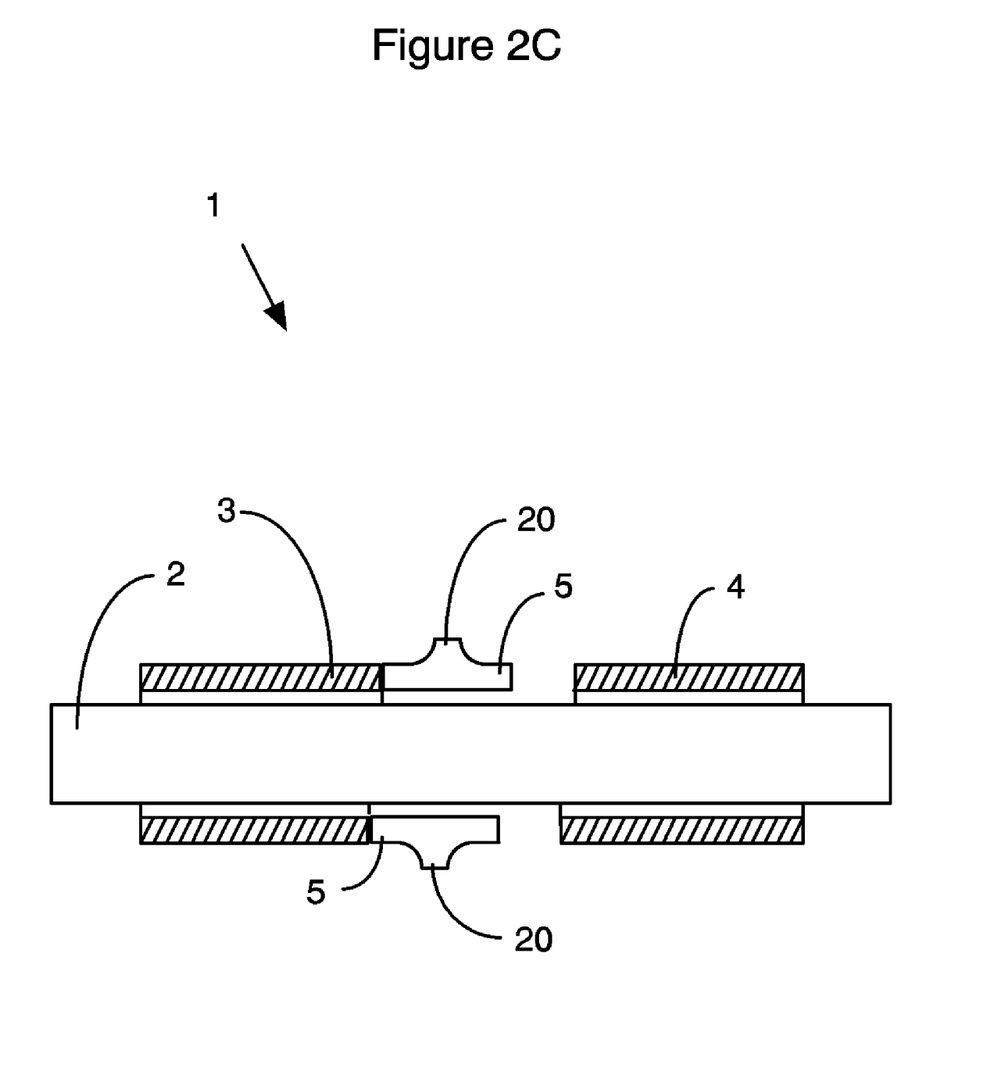
FIG. 2C illustrates a side cutaway view of another alternative preferred embodiment of the bidirectional clutch wherein the clutch jaw rotates freely about the support shaft. In this embodiment, the clutch jaw is driven externally, and support shaft merely positions the clutch jaw such that it aligns with the output drives.

FIG. 2C illustrates a side cutaway view of another alternative preferred embodiment of the bidirectional clutch 1. In this embodiment, the clutch jaw 5 rotates freely about the support shaft 2. Rotational input power is externally applied to the clutch jaw 5 at input power interface 20. Input power interface 20 maybe use suitable source of external power. For example, input power interface 20 may be a gear assembly, a chain drive, a belt drive, a frictional drive, etc. In this embodiment, the support shaft 2 merely positions the clutch jaw 5 such that it aligns with the output drives 3, 4.

Figure 2D:
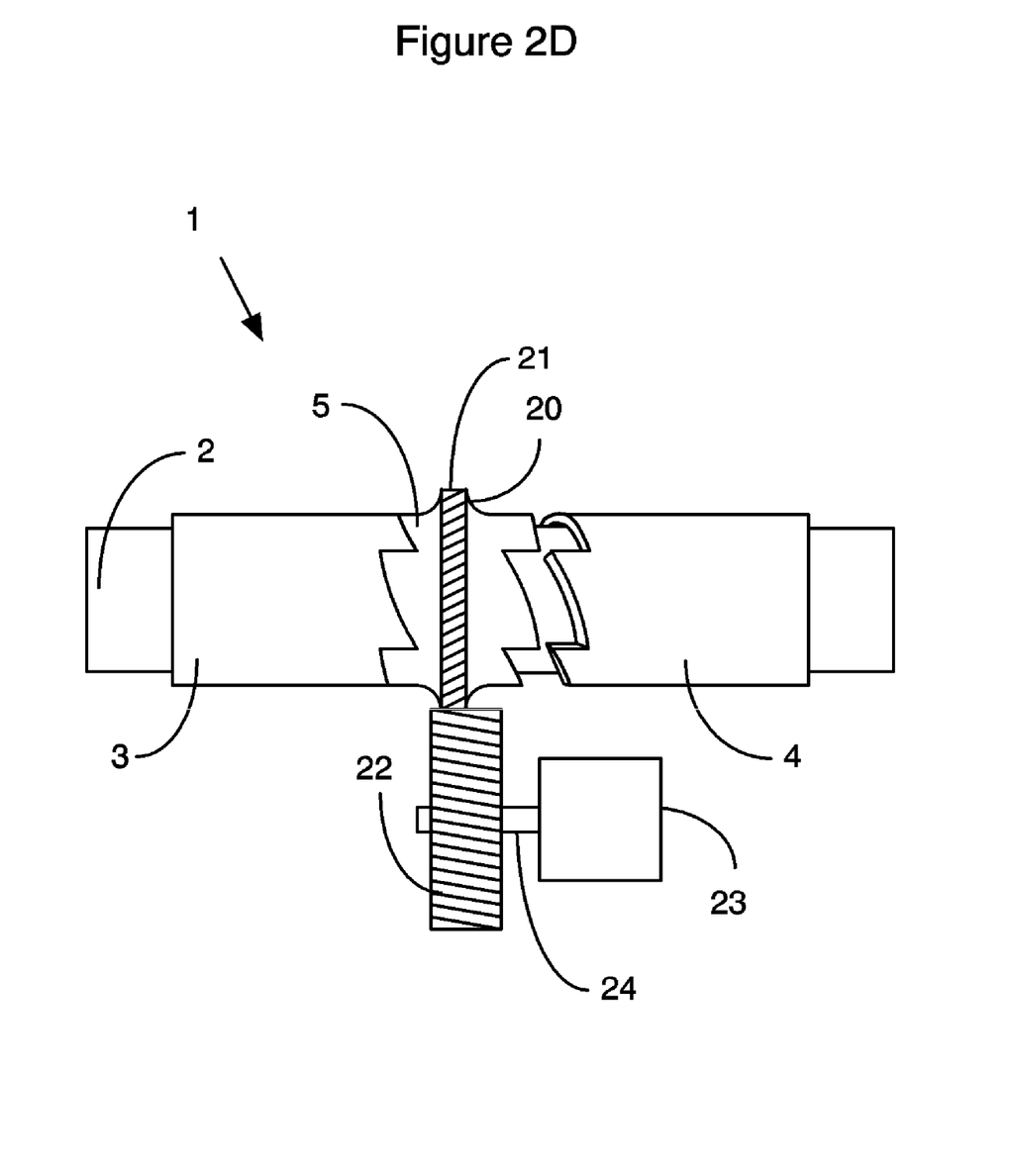
FIG. 2D illustrates a side view of a variation of the alternative preferred embodiment of FIG. 2C in which the externally driven bidirectional clutch uses a gear as the input power interface.

FIG. 2D illustrates a side cutaway view of a variation of the alternative preferred embodiment of FIG. 2C in which the externally driven bidirectional clutch 1 uses clutch jaw 5 that uses an integral gear 21 as the input power interface 20. In this figure, integral gear 21 is driven by motor gear 22 which is attached via shaft 24 to motor 23. In this figure, output drives 3, 4 are illustrated as direct drives. However, those skilled in the art will recognize that output drives three, 4 can just as easily be implemented as gear drives or chain drives.

Figure 2E:
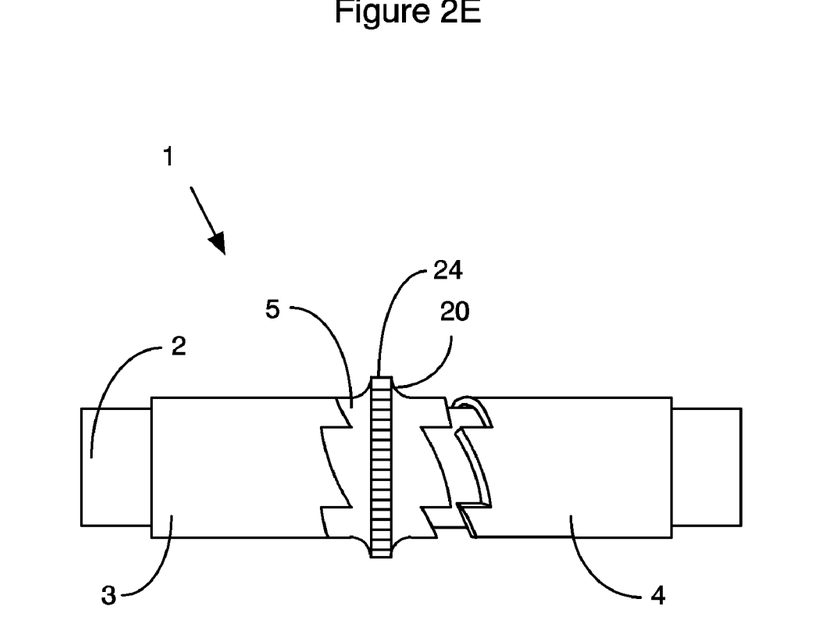
FIG. 2E illustrates a side view of a variation of the alternative preferred embodiment of FIG. 2D in which the externally driven bidirectional clutch uses a chain attached to a central gear as the input power interface.

FIG. 2E illustrates a side view of a variation of the alternative preferred embodiment of FIG. 2D in which the externally driven bidirectional clutch 1 uses a chain (not shown) attached to a chain drive dear 24 as the input power interface. By reversing direction of the chain drive, the chain drive gear 24 will disengage whichever output drive 3 or 4 is currently being driven and reverse direction to engage the previously disengaged output drive 3 or 4.

Figure 2F:
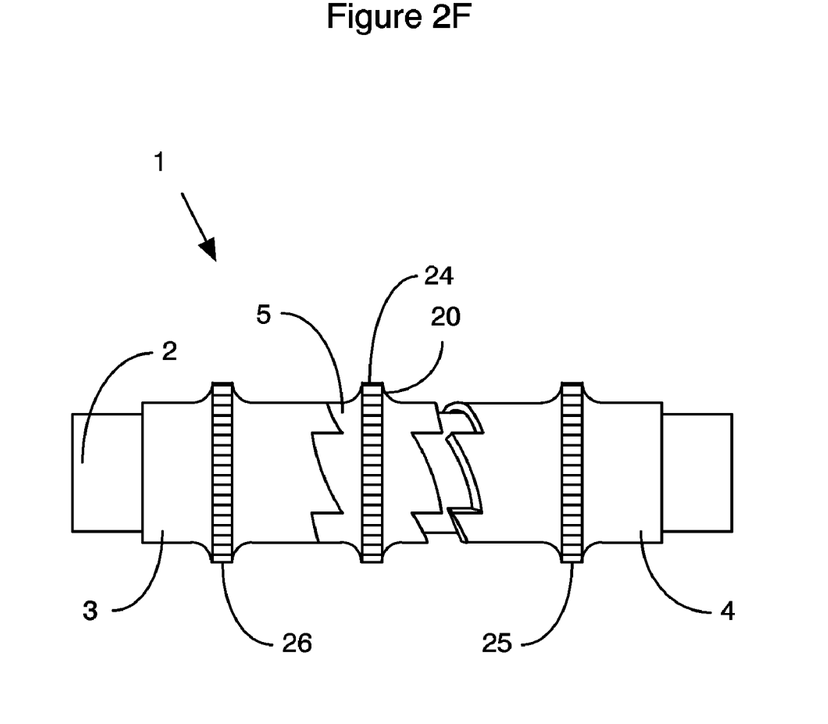
FIG. 2F illustrates a side view of a variation of the alternative preferred embodiment of FIG. 2E in which the externally driven bidirectional clutch uses a chain attached to a central gear as the input power interface, and chain drives as the output power interface.

FIG. 2F illustrates a side view of a variation of the alternative preferred embodiment of FIG. 2E in which the externally driven bidirectional clutch 1 uses a chain (not shown) attached to a chain drive gear 24 as the input power interface, and peripheral chain drive gears 25, 26 as the output power interface. By reversing direction of the chain drive, the chain drive gear 24 will disengage whichever peripheral chain drive gear 25 or 26 which is currently being driven and reverse direction to engage the previously disengaged peripheral chain drive here 25 for 26.

While the invention has been described with respect to a preferred embodiment thereof, it will be understood by those skilled in the art that various changes in detail may be made therein without departing from the spirit, scope, and teaching of the invention. For example, the material used to fabricate the directional clutch may be anything suitable for its purpose, the size and shape of the bidirectional clutch can vary. The type and number of cam surfaces and driving surfaces can vary, etc. The type of input power source and output drive can vary. Accordingly, the invention herein disclosed is to be limited only as specified in the following claims.

What is claimed is:

1. A bidirectional clutch, further comprising:
a central support shaft;
first and second peripheral output drives rotatably mounted onto the central support shaft;
a rotational power source;
a centrally mounted clutch jaw slidably and rotatably mounted on the central support shaft, and positioned between the first and second peripheral output drives, the centrally mounted clutch jaw having means for rotating in a first direction on the central support shaft under control of the rotational power source, and rotating in the opposite direction under control of the rotational power source;
the centrally mounted clutch jaw having first and second ends, each end having cam surfaces and a driving surface which faces the first and second peripheral output drives, respectively;
the first and second peripheral output drives having cam surfaces and driving surfaces on their ends which face the cam surfaces and driving surfaces of the first and second ends of the centrally mounted clutch jaw, respectively; and
the first and second cam surfaces and driving surfaces are structured such that when the first driving surface of the centrally mounted clutch jaw is engaged with the driving surface of the first peripheral output drive, it remains engaged while rotated in a first direction, and when the rotational power source reverses direction, the driving surface of the first peripheral output drive is disengaged and the first cam surface of the centrally mounted clutch jaw rotates toward the cam surface of the first peripheral output drive and slides up the cam surface of the first peripheral output causing axial motion of the centrally mounted clutch jaw such that it slides laterally along the central support shaft until it disengages from the first peripheral output drive and continues to slide laterally toward the second cam surface using momentum generated by sliding up the cam surface of the centrally mounted clutch jaw until it engages the driving surface of the second peripheral output drive;
wherein an axial force for switching the centrally mounted clutch jaw from one peripheral output drive to the other is provided solely by the currently engaged cam surface;
whereby reversing the direction of the rotational power source automatically disengages the centrally mounted clutch jaw from one peripheral output drive and engages it with the other peripheral output drive.

2. A bidirectional clutch, as in claim 1, wherein:
the means to rotate the centrally mounted clutch jaw is an integral gear which is disposed on its outer surface, and between the first and second cam surfaces; and
the rotational power source further comprises a gear assembly which engages the integral gear on the centrally mounted clutch jaw and controls the rotation of the centrally mounted clutch jaw.

3. A bidirectional clutch, as in claim 2, wherein:
the rotational power source further comprises an electric motor operatively connected to the gear assembly.

4. A bidirectional clutch, comprising:
a central support shaft;
first and second peripheral output drives rotatably mounted onto the central support shaft;
a rotational power source;
a centrally mounted clutch jaw slidably mounted on the central support shaft, and positioned between the first and second peripheral output drives, the centrally mounted clutch jaw having means for rotating laterally in a first direction on the central support shaft under control of the rotational power source, and rotating laterally in the opposite direction under control of the rotational power source;
the centrally mounted clutch jaw having first and second ends, each end having a plurality of cam surfaces and driving surfaces which face the first and second peripheral output drives, respectively;
the first and second peripheral output drives having cam surfaces and driving surfaces on their ends which face the cam surfaces and driving surfaces of the first and second ends of the centrally mounted clutch jaw, respectively;
the first and second cam surfaces and driving surfaces are structured such that when the first driving surface of the centrally mounted clutch jaw is engaged with the driving surface of the first peripheral output drive, it remains engaged while rotated in a first direction, and when the rotational power source reverses direction, the driving surface of the first peripheral output drive is disengaged and the first cam surface of the centrally mounted clutch jaw rotates toward the cam surface of the first peripheral output drive and slides up the cam surface of the first peripheral output drive causing axial motion of the centrally mounted clutch jaw such that it slides longitudinally along the central support shaft until it disengages from the first peripheral output drive and the second driving surface of the centrally mounted clutch jaw engages the driving surface of the second peripheral output drive;
a key;
a key slot in the central shaft which is sized to snugly fit a portion of the key; and
the centrally mounted clutch jaw further comprises a slot on its inner surface sized to slidably accept a portion of the key such that when the centrally mounted clutch jaw is mounted on the central shaft, the centrally mounted clutch jaw will rotate laterally in concert with the central shaft, but can still slide longitudinally along the central shaft when switching from one peripheral drive to the other;
wherein an axial force for switching the centrally mounted clutch jaw from one peripheral output drive to the other is provided solely by the currently engaged cam surface;
whereby, reversing the direction of the rotational power source automatically disengages the centrally mounted clutch jaw from one peripheral output drive and engages it with the other peripheral output drive.

5. A bidirectional clutch, as in claim 4, wherein:
the rotational power source is operatively connected to the central shaft;

whereby reversing the rotational direction of the central shaft reverses the rotation of the centrally mounted clutch jaw.

6. A bidirectional clutch, comprising:

a central support shaft;

first and second peripheral output drives rotatably mounted onto the central support shaft;

a rotational power source;

a centrally mounted clutch jaw slidably mounted on the central support shaft, and positioned between the first and second peripheral output drives, the centrally mounted clutch jaw having means for sliding longitudinally in a first direction on the central support shaft when the rotational power source is rotating in a first direction, and sliding longitudinally in the opposite direction when the rotational power source is rotating in a second direction;

the centrally mounted clutch jaw having first and second ends, each end having a plurality of cam surfaces and driving surfaces which face the first and second peripheral output drives, respectively;

the first and second peripheral output drives having cam surfaces on their ends which face the cam surfaces of the first and second ends of the centrally mounted clutch jaw, respectively;

the first and second cam surfaces and driving surfaces are structured such that when the first driving surface of the centrally mounted clutch jaw is engaged with the driving surface of the first peripheral output drive, it remains engaged while rotated in a first direction, and when the rotational power source reverses direction, the driving surface of the first peripheral output drive is disengaged and the first cam surface of the centrally mounted clutch jaw rotates toward the cam surface of the first peripheral output drive and slides up the cam surface of the first peripheral output drive causing axial motion of the centrally mounted clutch jaw such that it slides along the central support shaft until it disengages from the first peripheral output drive and the second driving surface of the centrally mounted clutch jaw engages the driving surface of the second peripheral output drive; and wherein an axial force for switching the centrally mounted clutch jaw from one peripheral output drive to the other is provided solely by the currently engaged cam surface;

whereby reversing the direction of the rotational power source automatically disengages the centrally mounted clutch jaw from one peripheral output drive and engages it with the other peripheral output drive.

7. A bidirectional clutch, as in claim 6, wherein:

the centrally mounted clutch jaw further comprises an integral gear which is disposed on its outer surface, and between the first and second cam surfaces; and the rotational power source further comprises a gear assembly which engages the integral gear on the centrally mounted clutch jaw and rotates the centrally mounted clutch jaw.

8. A bidirectional clutch, as in claim 7, wherein:

the rotational power source further comprises an electric motor operatively connected to the gear assembly.

\* \* \* \* \*